(12) United States Patent
Ahmad

(10) Patent No.: US 7,277,477 B1
(45) Date of Patent: Oct. 2, 2007

(54) ZERO OVERHEAD BACK CHANNEL FOR ADAPTIVE TRANSMIT FILTER UPDATES IN SERDES TRANSCEIVERS

(75) Inventor: Bilal Ahmad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1179 days.

(21) Appl. No.: 10/178,662

(22) Filed: Jun. 21, 2002

(51) Int. Cl.
 *H04B 1/38* (2006.01)
 *H04L 5/16* (2006.01)

(52) U.S. Cl. .......... 375/220; 375/221; 375/222; 375/213; 375/227; 455/69; 455/70; 370/208; 370/493

(58) Field of Classification Search .......... 375/220, 375/221, 219, 223, 144, 147, 230, 232, 152, 375/222; 455/69, 70, 266, 436; 370/208, 370/493
See application file for complete search history.

(56) References Cited

U.S. PATENT DOCUMENTS

| | | | |
|---|---|---|---|
| 5,144,304 A * | 9/1992 | McMahon et al. | 341/58 |
| 5,452,289 A * | 9/1995 | Sharma et al. | 370/286 |
| 6,188,337 B1 * | 2/2001 | Soljanin | 341/59 |
| 6,757,282 B1 * | 6/2004 | Ofek | 370/389 |
| 6,757,334 B1 * | 6/2004 | Feher | 375/259 |
| 6,778,536 B1 * | 8/2004 | Ofek et al. | 370/395.4 |
| 6,853,730 B2 * | 2/2005 | Coles et al. | 380/260 |
| 2002/0061012 A1 * | 5/2002 | Thi et al. | 370/352 |
| 2002/0098805 A1 * | 7/2002 | King | 455/63 |
| 2002/0186756 A1 * | 12/2002 | Kolze et al. | 375/152 |
| 2003/0081693 A1 * | 5/2003 | Raghavan et al. | 375/298 |
| 2003/0112896 A1 * | 6/2003 | Raghavan et al. | 375/322 |
| 2003/0123384 A1 * | 7/2003 | Agee | 370/208 |

OTHER PUBLICATIONS

"Equalizing Gigabit-per-Second Signals on Copper Media," Application Note: HFAN-06.0.1, Maxim Integrated Products, Rev 0, Mar. 2002, retrieved from the Internet on Jun. 20, 2002: <URL:http://pdfserv.maxim-ic.com/arpdf/Appnotes/6hfan6011.pdf>.

Logicore 8b/10b Encoder V3.0 Product Specification, Apr. 15, 2002, Xilinx Inc., 2100 Logic Drive, San Jose, CA 95124, retrieved from the Internet on Jun. 20, 2002: <URL:http://xilinx.com/ipcenter/logicore/docs/encode_8b10b.pdf>.

* cited by examiner

*Primary Examiner*—Mohammed Ghayour
*Assistant Examiner*—Qutub Ghulamali
(74) *Attorney, Agent, or Firm*—Charles E. Krueger

(57) ABSTRACT

A method and system that communicates adaptive transmit-side filter updates between a receiver and transmitter inserts additional versions of control codes into a back channel for encoding updates. Since the control codes are required in the back channel, no additional bandwidth of the back channel is used to communicate the updates.

26 Claims, 3 Drawing Sheets

At the receiver portion

At the transmitter portion

ZERO OVERHEAD BACK CHANNEL FOR ADAPTIVE TRANSMIT FILTER UPDATES IN SERDES TRANSCEIVERS

BACKGROUND OF THE INVENTION

State of the art SerDes transceivers signaling at rates on the order of 3.125 Gbps through typical FR4 back-plane channels utilize a simple 2-tap FIR (finite impulse response) transmit filter to equalize frequency dependent channel loss. One of the tap values is adjustable with respect to the other. This scheme is often referred to as pre-emphasis. Since there is only one tap value to adjust, it is left to the user to choose the right value for a given channel.

For data rates above 5 Gbps on FR4 back-planes, however, a simple 2-tap FIR filter is not sufficient to equalize for high frequency channel loss. Proposed solutions include an N-tap FIR transmit filter plus a fixed high boost filter at the receiver. For N>3 it becomes difficult for the user to select appropriate values of each filter coefficient for every channel used by the transceiver, hence, adaptive equalization is utilized. Since the N-tap FIR filter is implemented in the transmitter, the receiver must relay information on tap value updates back to the transmitter in order for the FIR filter to adapt to the channel.

Various techniques have been developed to solve the problem of relaying tap value updates from the receiver back to the transmitter.

Some solutions require insertion of additional data on a back channel to indicate tap update information, which results in a small increase in the channel data rate.

Other solutions require a separate physical channel to relay the tap update information. Apart from being an awkward solution, this solution rules out the use of the adaptive scheme on older systems where the additional physical back channel is not present.

Still other solutions propose that a supervisor chip read the information on tap value updates from the receiver and send it to the transmitter (both through an MDIO (management data input/output) interface, for example). Again, this solution unnecessarily involves processor overhead.

BRIEF SUMMARY OF THE INVENTION

In a first embodiment of the invention, additional versions of control codes utilized in a serial back channel are inserted into the back channel by the receiver to encode adjustments to a pre-emphasis filter in the transmitter. No additional bandwidth in the back channel is used for communicating the adjustment data.

In another embodiment of the invention, an additional version of the control code is utilized to encode an adjustment to a specific tap value in a transmit-side filter used for pre-emphasis.

In another embodiment of the invention, additional versions of START_PACKET control codes are utilized to control parameter value adjustments.

In another embodiment, the receiver includes a signal analyzer circuit for determining the magnitude of required tap value adjustments. The signal analyzer circuit controls an encoder which inserts additional versions of control codes encoding the parameter value adjustment.

In another embodiment, the transmitter includes a decoder that detects the additional control code versions encoding a tap adjustment and adjusts the parameter value in response thereto.

In another embodiment of the invention, the transmit-side filter is an FIR filter having adjustable tap values.

Other features and advantages of the invention will be apparent in view of the following detailed description and appended drawings.

DETAILED DESCRIPTION OF THE INVENTION

Figure 1:
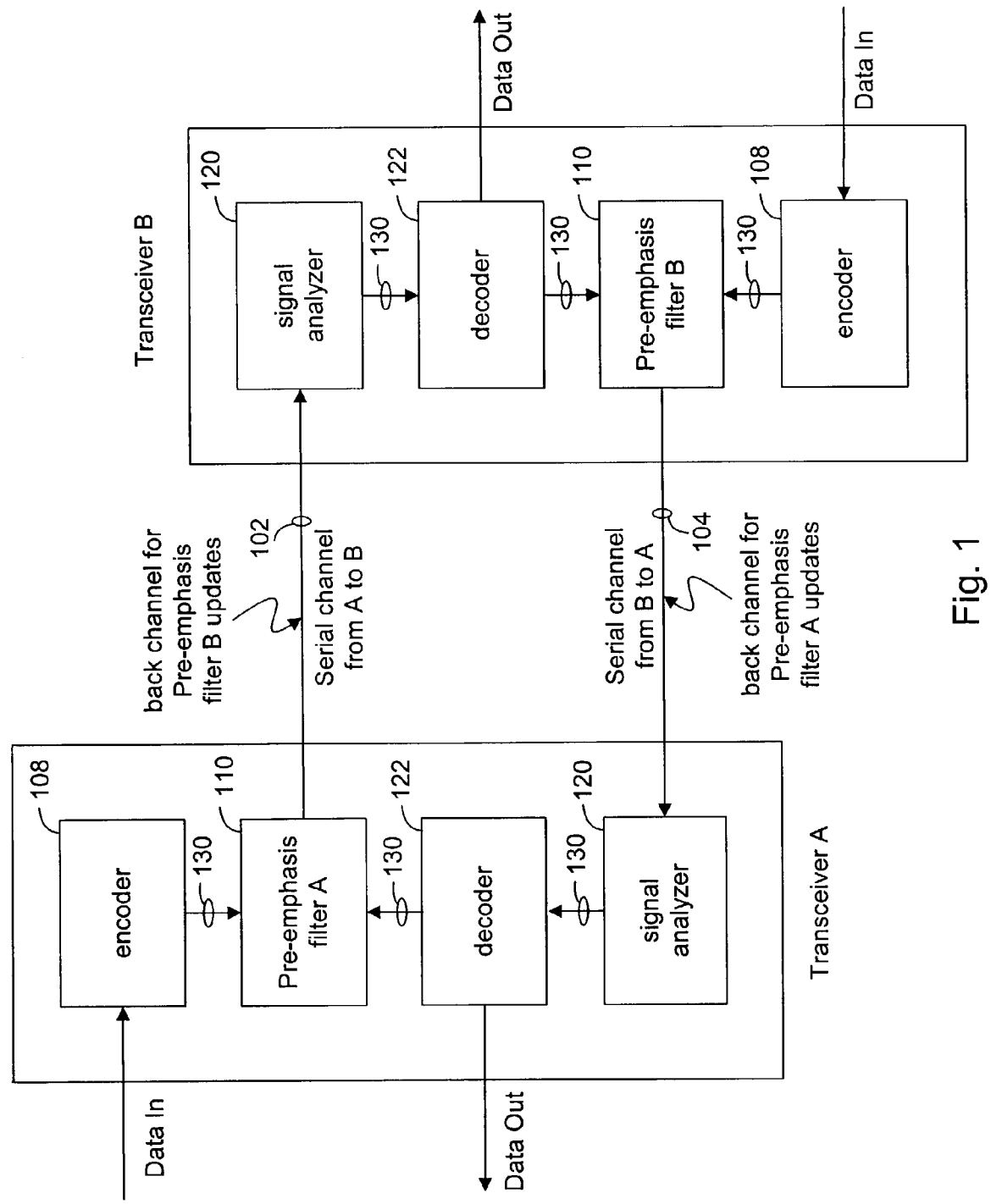
FIG. 1 is a block diagram of a system utilized in an embodiment of the invention.

The invention will now be described with reference to specific embodiments by way of example not limitation. In the drawings, like or similar parts in different views have the same reference number. It will be apparent that the invention has general utility in many other environments.

An overview of an embodiment of the invention will now be presented. The data transmitted across SerDes channels is encoded, often using a block code, e.g., the 8B/10B code. Even if a block code is not used to encode the data, delimiters (control characters) mark boundaries of a set of data such as a packet.

A control codeword START_PACKET may indicate that the following data comprises a packet until the control codeword END_PACKET is sent. When there is no data to send after an END_PACKET has been transmitted, the transmitter may send the IDLE control code until the next START_PACKET is sent.

Instead of using only one START_PACKET control code, for example, several START_PACKET control code versions can be utilized with each one indicating the start of a packet. For an N-tap FIR filter, there are N−1 adjustable taps. If 2×(N−1) additional control code versions indicating START_PACKET are available on the back channel, then the N-tap transmit FIR filter can be provided with tap update information without any overhead.

Consider, for example, a 6-tap FIR transmit filter. There are five adjustable parameters, i.e., tap weights, in this filter. If the back channel uses 10+1=11 total control code versions to indicate START_PACKET, each of the tap weights can be updated using the following technique.

When START_PACKET_0 is observed on the back channel, it indicates the start of a packet on that channel and it encodes that there is no updating of the forward channel FIR filter coefficients.

When START_PACKET_1 is observed on the back channel it indicates the start of a packet on that channel and it encodes that the first adjustable tap of the forward channel FIR filter is to be incremented by a step. When START_PACKET_2 is observed on the back channel it indicates the start of a packet on that channel and it encodes that the first adjustable tap of the forward channel FIR filter is to be decremented by a step. Similarly, START_PACKET_3 and START_PACKET_4 are used to adjust the second adjustable tap weight; START_PACKET_5 and START_PACKET_6 adjust the third adjustable tap weight; START_PACKET_7 and START_PACKET_8 adjust the fourth adjustable tap weight; and START_PACKET_9 and START_PACKET_10 adjust the fifth and last adjustable tap weight.

Clearly, several additional END_PACKET control code versions or several additional IDLE control code versions, or any other frequently occurring control codes, could be just as easily defined for this purpose. Also, the work could be distributed between different control codes. For example, six additional START_PACKET code versions and six additional END_PACKET code versions could be defined to update the five adjustable tap weights. Since the message space is usually much smaller than the code space (e.g., 8B/10B has 256 message words and 1024 code words), many extra code words are readily available to implement the embodiment being described.

An embodiment of a system for implementing the above-described technique will now be described with reference to FIG. 1. FIG. 1 depicts Transceivers A and B coupled by a first serial channel 102 for transmitting serial data from the Transceiver A to Transceiver B and by a second serial channel 104 for transmitting serial data from Transceiver B to Transceiver A. Thus, each transceiver has a transmit and receive channel, in this example, the transmit channel for Transceiver A is the first serial channel 102 and the receive channel is the second serial channel 104. FIG. 1 is a high level block diagram that depicts functional blocks which may be implemented in various forms including processor units, ASICs (Application Specific Integrated Circuits), and various combinations of hardware and software. The blocks of FIG. 1 symbolically represent the functionality of any of the implementations. Each transceiver includes a transmit and receive portions.

The transmit portion includes an encoder block 108 and an FIR block 110. The encoder block 108 receives and serializes data and inserts control codes into a serial transmit channel. The FIR filter block 110 includes an adjustment input and performs pre-emphasis on the serial transmit channel prior to transmission.

The receive portion includes a signal analyzer block 120 and a decoder block 122. The signal analyzer block 120 and decoder block 122 are coupled to the receive data on the receive channel. The decoder block 122 utilizes the control codes to recover byte boundaries and to convert the received serial channel to parallel data.

The blocks of each transceiver are coupled by an interconnect 130 so that signals may be communicated between the blocks.

Figure 2A:
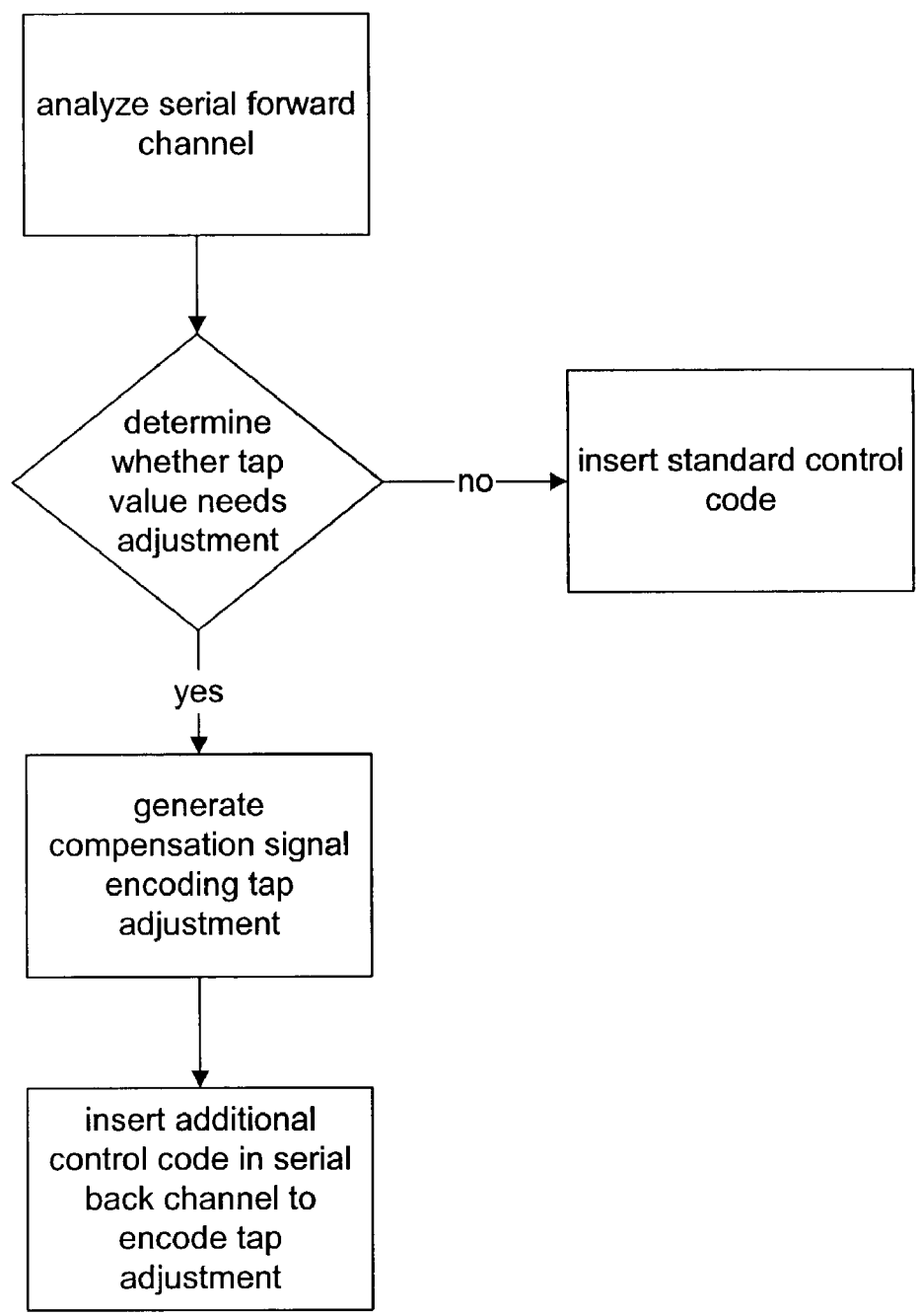
FIGS. 2A and 2B are flow charts illustrating the operation of an embodiment of the invention.
Figure 2B:
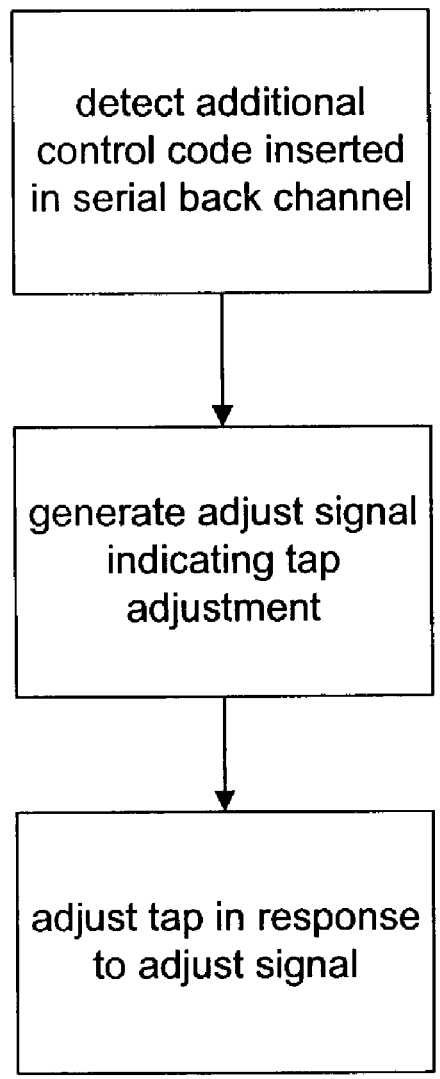

The operation of the system depicted in FIG. 1 will now be described with reference to the flow charts of FIGS. 2A and 2B. In the following example, the first serial channel 102 is the back channel for updates to the FIR in Transceiver B and the second serial channel 104 is the back channel for updates to the FIR in Transceiver A. The adjustment of the FIR of Transceiver A will be now described. In this case the first serial channel 102 is forward channel and the second serial channel 104 is the back channel.

When the serial forward channel is received at the Transceiver B, the signal is analyzed by the signal analyzer 120 to determine whether any tap values of the FIR filter 110 of Transceiver A need to be adjusted. If an adjustment is required, the number of the tap to be adjusted, the direction of adjustment, i.e., increase or decrease the tap value, and the number of adjustment steps are output on a compensation control signal sent to the Transceiver B encoder 108.

In response to the compensation control signal, the Transceiver B encoder 108 inserts the appropriate additional START_PACKET control code, instead of the standard START_PACKET code, to encode the number of the tap to be adjusted and the direction of adjustment. For example, in the encoding scheme described above, if the third tap value were to be increased by three steps then the control code START_PACKET_5 would be inserted into the back channel three times in place of the standard START_PACKET code.

The serial back channel is transmitted over the second serial link 104 with the additional control codes and received by the Transceiver A decoder 122. Each time the START_PACKET_5 code is detected at the Transceiver A decoder 112 an adjustment control signal is output to the Transceiver A FIR filter 110 to increase the tap value of the third tap by one unit.

The above embodiment utilizes a transmit-side, multi-tap FIR filter for pre-emphasis. Other embodiments of the invention utilize different types of filters, well-know in the art, which have adjustable parameters such as digital filters of type FIR, digital filters of type IIR (infinite impulse response), and analog filters with a finite number of poles and zeros. The technique described above of adaptively providing adjustment information through the insertion of alternate control codes is utilized to communicate the adjustments to be applied to the transmit-side filter.

Thus, a technique for adaptively adjusting the pre-emphasis without consuming any additional bandwidth on the back channel has been described. Alternatives and substitutions will now be apparent to persons of ordinary skill in the art. For example, as described above, additional control codes could be defined for the IDLE control signal or any other control signal regularly inserted into the back channel. Additionally, the magnitude of the tap adjustment could also be encoded by the additional control signal, e.g., IDLE_1_2 could encode increasing the tap value of the first tap by two units. Accordingly, it is not intended to limit the invention except as provided by the appended claims.

What is claimed is:

1. A method for performing adaptive pre-emphasis, where a receiver and transmitter are coupled by a serial back channel, with data transmitted on the serial back channel including control codes, with a particular control code having a plurality of additional control code versions, and with the transmitter including an N-parameter transmit filter for implementing pre-emphasis on transmitted data, and with the N-parameter transmit filter having an adjustable parameter value for each of (N−1) parameters, the method comprising the acts of:

at the receiver, inserting a first additional control code version, instead of the particular control code, into the serial back channel to encode an increase or decrease to the value of a selected parameter of the N-parameter transmit filter; and at the transmitter, responding to the first additional control code version, when received, to increase or decrease the value of the selected parameter of the transmit filter encoded by the additional control code.

2. The method of claim 1 further comprising the act of:
at the receiver:

analyzing a received signal to determine whether the transmit filter of a transmitter sending the received signal requires an adjustment; and determining which parameters of the transmit filter require adjustment and the magnitude of the adjustment required.

3. The method of claim 1 where the step of inserting a first additional control code version further comprises the step of:

inserting an additional version of a start packet control code into the back channel, instead of the particular control code, that indicates a particular transmit filter parameter and adjustment value.

4. A system for performing adaptive pre-emphasis, where a receiver and transmitter are coupled by a serial back channel, with data transmitted on the serial back channel including control codes, with a particular control code having a plurality of additional control code versions, and with the transmitter including an N-parameter transmit filter for implementing pre-emphasis on transmitted data, and with the N-parameter transmit filter having an adjustable parameter value for each of (N−1) parameters, the system comprising:

means, at the receiver, for inserting a first additional control code version, instead of the particular control code, into a serial back channel to encode an increase or decrease to the parameter value of a selected parameter of the N-parameter transmit filter; and means, at the transmitter, for responding to the first additional control code version, when received, to increase or decrease the parameter value of the selected parameter of the transmit filter encoded by the additional control code.

5. The system of claim 4 further comprising:

means, at the receiver, for analyzing a received signal to determine whether the transmit filter of a transmitter sending the received signal requires an adjustment and for determining which parameters of the transmit filter require adjustment and the magnitude of the adjustment required.

6. In a serial transceiver adapted to send and receive serial channels, a system configured to provide adaptive pre-emphasis information to another transceiver transmitting the received serial channel, the system comprising:

a signal analyzing unit adapted to analyze the received serial channel and determine a transmit filter parameter identity and adjustment value required to improve pre-emphasis; and an encoder unit adapted to respond to a determination by the signal analyzing unit and configured to replace a standard control code inserted into a serial transmitted data channel with a first additional version of the standard control code to indicate the determined transmit filter parameter identity and adjustment value.

7. The system of claim 6 where the encoder unit is adapted to insert a first additional version of a start packet control code instead of a standard control code into the serial transmitted data channel to indicate the transmit filter parameter identity and adjustment value.

8. A system comprising:

a transceiver having a transmitter portion adapted to transmit on a serial transmit channel and having a receiver portion adapted to transmit on a serial receive channel, with both the transmit and receive channels including control codes, with the transmitter portion including:

a transmit filter having adjustable parameters, each having a parameter value, with the transmit filter adapted to perform pre-emphasis on the serial transmit channel prior to transmission and to adjust the parameter value in response to a parameter adjustment control signal;

an encoder adapted to receive and serialize data and insert control codes into the serial transmit channel and respond to a compensation signal for inserting an additional control code, instead of standard control code, encoding a parameter adjustment into the serial transmit channel;

and with the receiver portion including:

a signal analyzer adapted to analyze the serial receive channel and determine whether a particular parameter value of the transmit filter of another transceiver transmitting the serial receive channel requires adjustment and to output a compensation signal indicating a parameter adjustment comprising a parameter identity and direction of adjustment;

a decoder adapted to decode an additional control code and output the parameter adjustment control signal indicating a parameter adjustment encoded by an additional control code included in the serial receive channel received from the other transceiver; and with the transceiver including an interconnect adapted to transmit signals between the encoder, decoder, signal analyzer, and transmit filter.

9. A method for providing adaptive feedback over a serial back channel, including standard control codes, to a transmitter that utilizes a multi-parameter transmit filter to perform pre-emphasis on a forward serial transmit channel, the method comprising the steps of:

analyzing a serial transmit channel to determine whether the multi-parameter transmit filter of a transmitter sending the forward serial transmit channel requires an adjustment;

determining which parameters of the multi-parameter transmit filter require adjustment and the magnitude of the adjustment required; and inserting a first additional control code version, instead of a particular control code, into a serial back channel to encode an increase or decrease to the parameter value of a selected parameter of the transmit filter.

10. A system for providing adaptive feedback over a serial back channel, including standard control codes, to a transmitter that utilizes a multi-parameter transmit filter to perform pre-emphasis on a forward serial channel, the system comprising:

means for analyzing a serial transmit channel to determine whether the transmit filter of a transmitter sending the serial transmit channel requires an adjustment; and means for determining which parameters of the transmit filter require adjustment and the magnitude of the adjustment required; and means for inserting a first additional control code version, instead of a particular control code, into a serial back channel to encode an increase or decrease to the parameter value of a selected parameter of the transmit filter.

11. A method for responding to adaptive feedback information included in a serial back channel, with the adaptive feedback information encoded as a first additional control code, inserted instead of a particular standard control code, included in the serial back channel, with a multi-parameter transmit filter utilized to perform pre-emphasis, the method comprising the steps of:

decoding the first additional control code to determine direction of adjustment and identity of a particular transmit filter parameter to be adjusted; and adjusting the particular transmit filter parameter according to the determined direction of adjustment.

12. A system for responding to adaptive feedback information included in a serial back channel, with the adaptive feedback information encoded as a first additional control code, inserted instead of a particular standard control code, included in the serial back channel, with a multi-parameter transmit filter utilized to perform pre-emphasis, the system comprising:

means for decoding the first additional control code to determine direction of adjustment and identity of a particular transmit filter parameter to be adjusted; and means for adjusting the particular transmit filter parameter according to a determined direction of adjustment.

13. A method for performing adaptive pre-emphasis, where a receiver and transmitter are coupled by a serial back channel, with data transmitted on the serial back channel including control codes, with a particular control code having a plurality of additional versions, and with the transmitter including an N-tap finite impulse response (FIR) filter for implementing pre-emphasis on transmitted data, and with the N-tap FIR filter having an adjustable tap value for each of (N−1) adjustable taps, the method comprising the acts of:

at the receiver, inserting a first additional control code version, instead of the particular control code, into the serial back channel to encode an increase or decrease to the tap value of a selected tap of the FIR; and at the transmitter, responding to the first additional control code version, when received, to increase or decrease the tap value of the selected tap of the FIR filter encoded by the additional control code.

14. The method of claim 13 further comprising the steps of:

at the receiver:

analyzing a received signal to determine whether the FIR of a transmitter sending the received signal requires an adjustment; and determining which taps of the FIR require adjustment and the magnitude of the adjustment required.

15. The method of claim 13 where the step of inserting a first additional control code version further comprises the step of:

inserting an additional version of a start packet control code into the back channel, instead of the particular control code, that indicates a particular FIR tap and adjustment value.

16. A system for performing adaptive pre-emphasis, where a receiver and transmitter are coupled by a serial back channel, with data transmitted on the serial back channel including control codes, with a particular control code having a plurality of additional versions, and with the transmitter including an N-tap finite impulse response (FIR) filter for implementing pre-emphasis on transmitted data, and with the N-tap FIR filter having an adjustable tap value for each of (N−1) adjustable taps, the system comprising:

means, at the receiver, for inserting a first additional control code version, instead of the particular control code, into a serial back channel to encode an increase or decrease to the tap value of a selected tap of the FIR; and means, at the transmitter, for responding to the first additional control code version, when received, to increase or decrease the tap value of the selected tap of the FIR filter encoded by the additional control code.

17. The system of claim 16 further comprising:

means, at the receiver, for analyzing a received signal to determine whether the FIR of a transmitter sending the received signal requires an adjustment and for determining which taps of the FIR require adjustment and the magnitude of the adjustment required.

18. In a serial transceiver adapted to send and receive serial channels, a system configured to provide adaptive pre-emphasis information to another transceiver transmitting the received serial channel, the system comprising:

a signal analyzing unit adapted to analyze the received serial channel and determine a finite impulse response (FIR) tap identity and adjustment value required to improve pre-emphasis; and an encoder unit adapted to respond to a determination by the signal analyzing unit and to replace a standard control code inserted into the transmitted data channel with a first additional version of the standard control code to indicate the determined FIR tap identity and adjustment value.

19. The system of claim 18 where the encoder unit is adapted to insert a first additional version of a start packet control code instead of a standard control code into the serial transmitted channel to indicate the FIR tap identity and adjustment value.

20. In a serial transceiver adapted to send and receive serial channels, a system adapted to respond to adaptive pre-emphasis information received from another transceiver transmitting a received serial channel, said system comprising:

a decoder unit adapted to respond to a first additional version of a standard control code included in the received serial channel to determine a finite impulse response (FIR) tap identity and adjustment value indicated by the first additional control code, with a determined tap identity and adjustment value utilized to adjust the FIR tap value to improve pre-emphasis.

21. The system of claim 20 where the decoder is adapted to respond to a first additional version of a start packet control code included in a received channel that indicates the FIR tap identity and adjustment value.

22. A system configured to adaptively control pre-emphasis of a transmitted serial channel, the system comprising:

a transceiver having a transmitter portion adapted to transmit on a serial transmit channel and having a receiver portion adapted to receive on a serial receive channel, with both the transmit and receive channels including control codes, with the transmitter portion including:

a finite impulse response (FIR) filter, having adjustable taps, each having a tap value, with the FIR filter adapted to perform pre-emphasis on the serial transmit channel prior to transmission and to adjust the tap values in response to a tap adjustment control signal;

an encoder adapted to receive and serialize data and insert control codes into the serial transmit channel and respond to a compensation signal for inserting an additional control code, instead a of standard control code, encoding a tap adjustment into the serial transmit channel;

and with the receiver portion including:

a signal analyzer adapted to analyze the serial receive channel and to determine whether a particular tap value of the FIR filter of another transceiver transmitting the serial receive channel requires adjustment and adapted to output a compensation signal indicating a tap adjustment comprising a tap identity and direction of adjustment;

a decoder adapted to decode an additional control code and output the tap adjustment control signal indicating a tap adjustment encoded by an additional control code included in the serial receive channel received from the other transceiver; and with the transceiver including an interconnect adapted to transmit signals between the encoder, decoder, signal analyzer, and FIR filter.

23. A method for providing adaptive feedback over a serial back channel, including standard control codes, to a transmitter that utilizes a multi-tap finite impulse response (FIR) filter to perform pre-emphasis on a forward serial channel, the method comprising the steps of:

analyzing a serial transmit channel to determine whether the multi-tap FIR filter of a transmitter sending the serial transmit channel requires an adjustment; and determining which taps of the multi-tap FIR filter require adjustment and the magnitude of the adjustment required; and inserting a first additional control code version, instead of a particular control code, into a serial back channel to encode an increase or decrease to a tap value of a selected tap of the FIR.

24. A system for providing adaptive feedback over a serial back channel, including standard control codes, to a transmitter that utilizes a multi-tap finite impulse response (FIR) filter to perform pre-emphasis on a forward serial channel, the system comprising:

means for analyzing a serial transmit channel to determine whether the multi-tap FIR filter of a transmitter sending the serial transmit channel requires an adjustment; and means for determining which taps of the multi-tap FIR filter require adjustment and the magnitude of the adjustment required; and means for inserting a first additional control code version, instead of a particular control code, into a serial back channel to encode an increase or decrease to a tap value of a selected tap of the multi-tap FIR filter.

25. A method for responding to adaptive feedback information included in a serial back channel, with the adaptive feedback information encoded as a first additional control code, inserted instead of a particular standard control code, included in the serial back channel, with a multi-tap finite impulse response (FIR) filter utilized to perform pre-emphasis, the method comprising the steps of:

decoding the first additional control code to determine direction of adjustment and identity of a particular FIR tap to be adjusted; and adjusting the particular FIR tap according to a determined direction of adjustment.

26. A system for responding to adaptive feedback information included in a serial back channel, with the adaptive feedback information encoded as a first additional control code, inserted instead of a particular standard control code, included in the serial back channel, with a multi-tap finite impulse response (FIR) FR filter utilized to perform pre-emphasis, the system comprising:

means for decoding the first additional control code to determine direction of adjustment and identity of a particular FIR tap to be adjusted; and means for adjusting the particular FIR tap according to the determined direction of adjustment.

* * * * *